L. H. HASSE.

Lamp.

No. 30,314. Patented Oct. 9, 1860.

Witnesses:

Inventor:
Ludwig H. Hasse

UNITED STATES PATENT OFFICE.

LUDWIG H. HASSE, OF NEW YORK, N. Y.

SUBMARINE LAMP.

Specification of Letters Patent No. 30,314, dated October 9, 1860.

*To all whom it may concern:*

Be it known that I, LUDWIG H. HASSE, of the city, county, and State of New York, have invented a new and useful Submarine Lamp; and I do hereby declare that the following is a full, clear, and exact description thereof, reference being had to the annexed drawing, in which—

Figure 1:
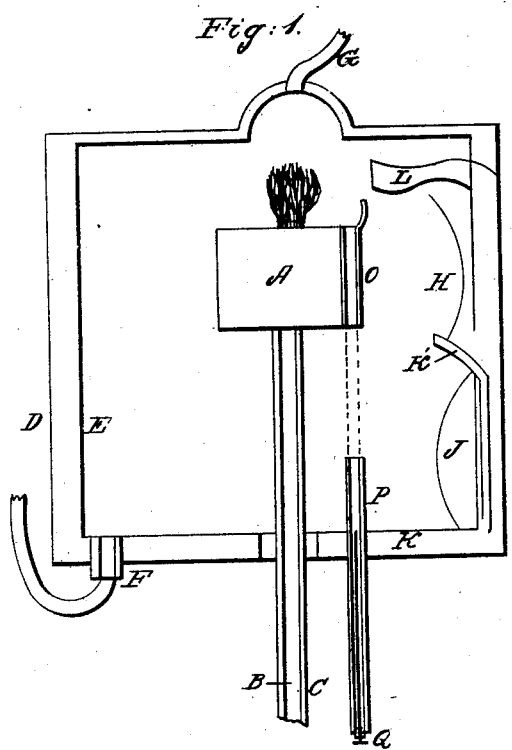
Figure 2:
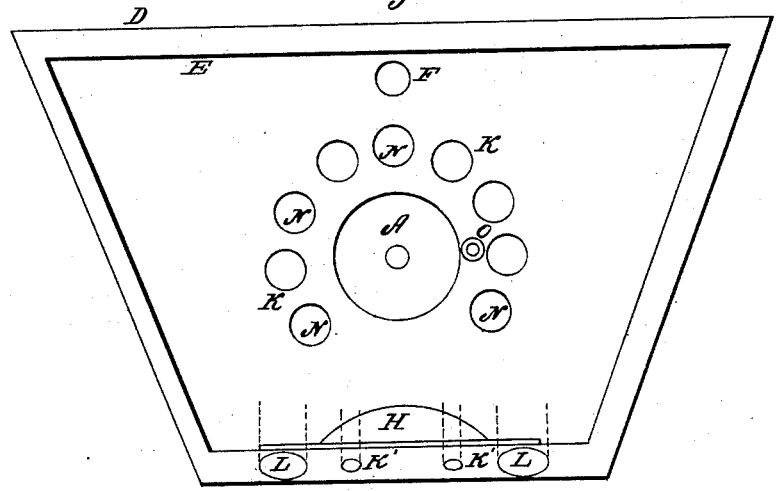

Figure 1, is a vertical cross section of my submarine lamp. Fig. 2 is a horizontal section of the same.

The said drawing forms a part of this specification and the same letters of reference denote the same parts in both figures.

To enable others skilled in the art to make and use my invention I will proceed to describe its construction and operation.

In the annexed drawing A represents the lamp, B represents a vertical tube on which the same rests; the said tube slides in another tube C in the bottom of the casing K, by which arrangement the lamp may be shoved upward or downward in its casing as may be desired. The casing of said lamp consists of double glasses D and E on the front and sides and a double metallic bottom K leading through a pipe K' into the interior of the inside casing.

Air is supplied to the lamp by means of the pipe F connected with the atmospheric air by a tube of gutta percha or similar material.

The double plated bottom K is filled with caustic potash and the openings N, N, N, N on the inside of the bottom will afford a contact between the products of combustion and the liquid caustic potash by which the former will be mostly absorbed. The remainder will be carried up through the pipes L inserted in the back of the casing and may be disposed of and carried out of the casing by the exhaust pipe G inserted in the top of the said lamp and connected with an exhaust pump on the vessel.

H and J represent reflectors the one being concave and the other convex for the purpose of throwing the light of the lamp in different directions.

The lamp A is provided with a small tube O into which the piston Q of another small tube P is made to work. In the said tube P another still smaller tube is inserted and sliding therein and upward. It contains a compound ignitible by friction (somewhat similar to the igniting compound of lucifer matches,) which when shoved into the pipe O will create a flame which will ignite the wick of the lamp A. The said wick may also be ignited by two wires contained in the exhaust hose G and ending in the positive and negative pole of a galvanic battery which is set in motion on the vessel.

When it is desired to use this submarine lamp independent of the vessel or apparatus above the water, it is attached to a receptacle containing compressed oxygen gas which may be gradually admitted into the interior of the lamp casing by means of valves or cocks. In this case, carbonic acid only is produced by combustion and this is entirely absorbed by the caustic potash, and therefore no exhaust pipe is required. The submarine lamp as represented in the drawing requires the supply of air from above and the removal of some products of combustion by an exhaust pipe.

What I claim as new and desire to secure by Letters Patent, is—

1. The construction and arrangement of the submarine lamp, substantially as described, with a double bottom of the casing, containing caustic potash, and with an exhaust pipe, for the purpose of easily removing the products of combustion.

2. The submarine lamp substantially as specified in combination with the tubes O and P, and with the piston Q, working on a detonating compound, for the purpose of igniting the same substantially as set forth.

LUDWIG H. HASSE.

Witnesses:
CHAS. WEHLE,
FUL. WEHLE.